(No Model.)

W. H. DYER.
CHURN.

No. 295,862. Patented Mar. 25, 1884.

WITNESSES:
Fred G. Dieterich
Arthur L. Morsell

William H. Dyer,
INVENTOR.
By Louis Bagger & Co.
ATTORNEYS.

UNITED STATES PATENT OFFICE.

WILLIAM HENRY DYER, OF MIDWAY, VIRGINIA.

CHURN.

SPECIFICATION forming part of Letters Patent No. 295,862, dated March 25, 1884.

Application filed November 16, 1883. (No model.)

*To all whom it may concern:*

Be it known that I, WILLIAM H. DYER, a citizen of the United States, and a resident of Midway, in the county of Halifax and State of Virginia, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 2:
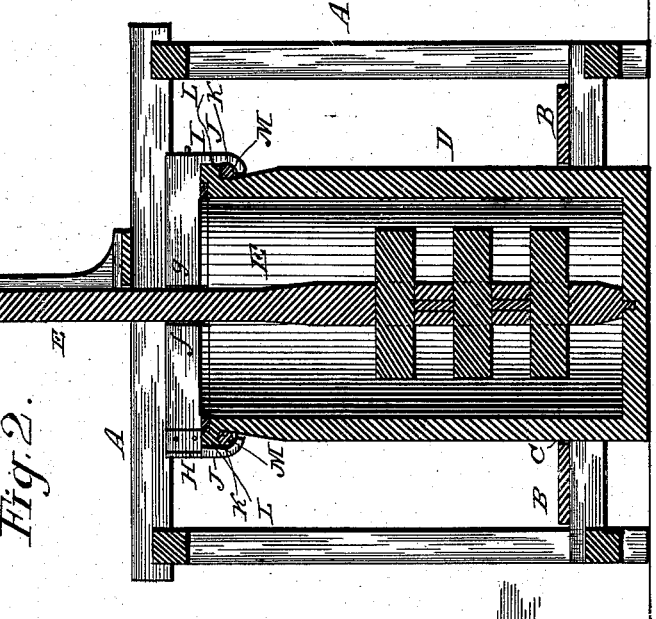
Figure 3:
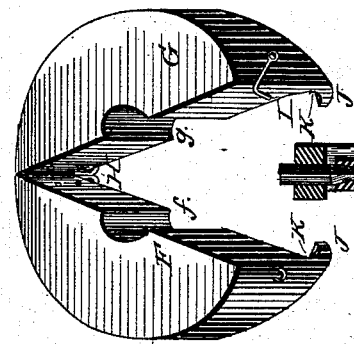
Figure 1:
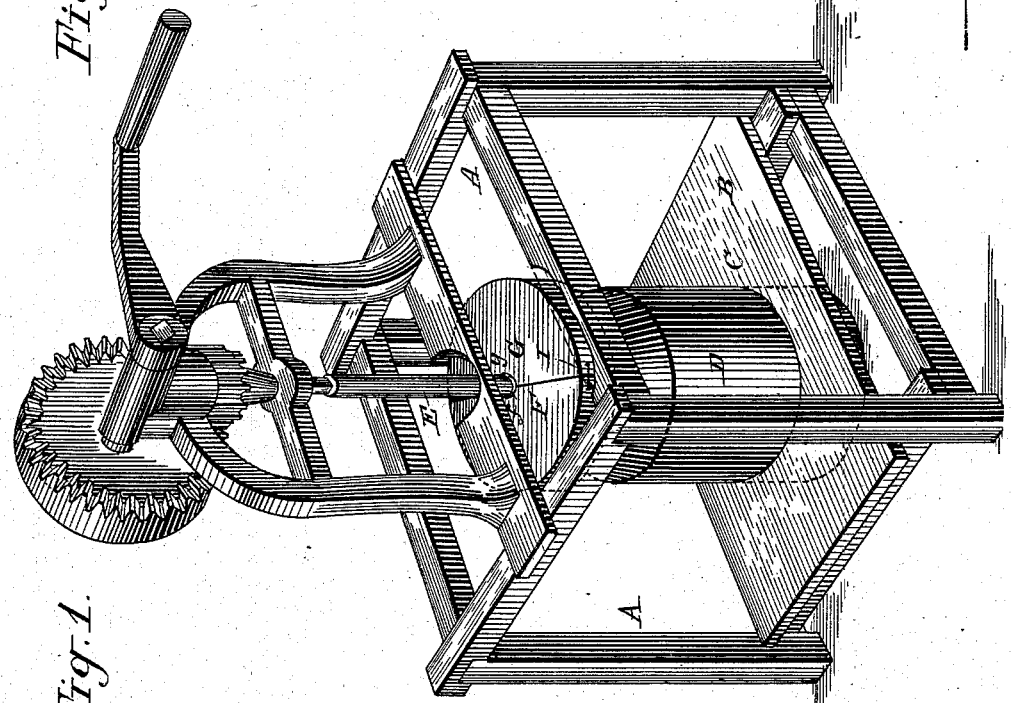

Figure 1 is a perspective view of my improved churn. Fig. 2 is a vertical sectional view of the same, and Fig. 3 is a perspective view of the cover removed.

Similar letters of reference indicate corresponding parts in all the figures.

In the accompanying drawings, A denotes the frame, the bottom B of which has a circular aperture, C, through which the bottom of the churn D is inserted to hold it firmly in place during the operation of churning.

Upon the top part of the frame is fixed the gearing for rotating the dasher, which may be of any desired construction.

E is the dasher-staff, which is inserted through the cover in the usual manner and attached at its upper end to the gear mechanism, whereby a rotary motion is imparted to the dasher.

The cover is made in two semicircular parts, F and G, hinged together at H, and having a hook or other means of fastening, I, at the opposite end. The two parts F and G have semicircular recesses $f$ and $g$, for the insertion of the dasher-staff, and are provided with flanges J, on the inside of which are grooves K.

The top part of the churn has an annular flange, L, provided with a packing-ring or gasket, M, of rubber, leather, or other suitable material, and this flange, with its gasket or packing, is adapted to fit into the grooves K.

When the two parts of the cover are locked together by the fastening I, it will be held firmly in place upon the churn, forming an air-tight cover for the same, and absolutely preventing all waste of the cream by spilling.

Having thus described my invention, I claim and desire to secure by Letters Patent of the United States—

In a churn, the combination of the cream-receptacle D, having flange L and gasket M, and cover consisting of the hinged parts F and G, recessed at $f$ and $g$, and having grooved flanges J and fastening H, as shown and specified.

In testimony that I claim the foregoing as my own I have hereunto affixed my signature in presence of two witnesses.

WILLIAM HENRY DYER.

Witnesses:
THOS. R. JORDAN,
WM. A. ROGERS.